US008579560B2

(12) United States Patent
Tatsuda

(10) Patent No.: US 8,579,560 B2
(45) Date of Patent: Nov. 12, 2013

(54) INDEX DEVICE FOR MACHINE TOOL

(75) Inventor: Yoshinori Tatsuda, Kanazawa (JP)

(73) Assignee: Tsudakoma Kogyo Kabushiki Kaisha, Kanazawa-shi, Ishikawa (JP)

( * ) Notice: Subject to any disclaimer, the term of this patent is extended or adjusted under 35 U.S.C. 154(b) by 1013 days.

(21) Appl. No.: 12/602,849

(22) PCT Filed: Jul. 1, 2008

(86) PCT No.: PCT/JP2008/061888
§ 371 (c)(1),
(2), (4) Date: Dec. 3, 2009

(87) PCT Pub. No.: WO2009/005051
PCT Pub. Date: Jan. 8, 2009

(65) Prior Publication Data
US 2010/0178125 A1 Jul. 15, 2010

(30) Foreign Application Priority Data
Jul. 3, 2007 (JP) ................................. 2007-175080

(51) Int. Cl.
*B23C 1/14* (2006.01)
*B23Q 5/10* (2006.01)
*B23Q 3/00* (2006.01)

(52) U.S. Cl.
USPC ........... 409/216; 409/231; 409/230; 74/813 L

(58) Field of Classification Search
USPC ......... 409/231, 232, 233, 230, 144, 201, 211, 409/216; 408/239 R, 239 A; 29/27 R, 27 C; 74/813 R, 813 L
See application file for complete search history.

(56) References Cited

U.S. PATENT DOCUMENTS 3,469,123 A * 9/1969 Kojima Toshio et al. .. 310/49.09
3,757,147 A * 9/1973 Lyman, Jr. ................. 310/49.09
(Continued)

FOREIGN PATENT DOCUMENTS

DE      10027750 A1 * 12/2001
DE   20 2005 018002 U1   1/2006
(Continued)

OTHER PUBLICATIONS

Machine Translation JP 11-099433 A, which JP '433 was published Apr. 1999.*

(Continued)

*Primary Examiner* — Erica E Cadugan
(74) *Attorney, Agent, or Firm* — Westerman, Hattori, Daniels & Adrian, LLP

(57) ABSTRACT

An index device for a machine tool includes a rotary shaft (40) to which a drive object is attached, a housing (30) surrounding the rotary shaft (40), a bearing (BI, B2) secured between the housing (30) and the rotary shaft (40) by a securing member (30*b*), and a drive (M) provided around the rotary shaft (40) and including a rotor (M1*a*, M2*a*) and a stator (M1*b*, M2*b*). The stator (M1*b*, M2*b*) is attached to the housing (30) and the rotor (M1*a*, M2*a*) is attached to the rotary shaft (40). The rotary shaft (40), the bearing (BI, B2), the rotor (M1*a*, M2*a*), and the securing member (30*b*) are connected together to form a built-in unit (22) that can be inserted into and extracted from an enclosure unit including a casing member (30*a*, 31*a*) of the housing (30) and the stator (M1*b*, M2*b*), thus facilitating connection and disconnection of wiring between the stator of a DD motor mounted in a spindle head of a machine tool and a main body of the machine tool.

2 Claims, 7 Drawing Sheets

(56) References Cited

U.S. PATENT DOCUMENTS

| | | | |
|---|---|---|---|
| 4,570,313 A * | 2/1986 | Holmstrom et al. | 409/231 |
| 4,599,023 A * | 7/1986 | Poincenot | 409/233 |
| 4,856,153 A * | 8/1989 | Gusching | 409/231 |
| 5,584,621 A | 12/1996 | Bertsche et al. | |
| 6,073,323 A * | 6/2000 | Matsumoto | 409/144 |
| 6,615,466 B1 * | 9/2003 | Sahm et al. | 409/231 |
| 2004/0074074 A1 | 4/2004 | Kikkawa et al. | |
| 2006/0034670 A1 | 2/2006 | Sugita et al. | |
| 2007/0110533 A1 | 5/2007 | Geissler et al. | |
| 2010/0329807 A1 * | 12/2010 | Tatsuda | 409/231 |

FOREIGN PATENT DOCUMENTS

| | | |
|---|---|---|
| EP | 1281472 A2 * | 2/2003 |
| JP | 64-009033 U | 1/1989 |
| JP | 11-099433 A | 4/1999 |
| JP | 2002-303322 A | 10/2002 |
| JP | 2003-159622 A | 6/2003 |
| JP | 2004-082287 A | 3/2004 |
| JP | 2004-322306 A | 11/2004 |
| JP | 2006-007328 A | 1/2006 |
| JP | 2006-007329 A | 1/2006 |
| JP | 2006-102906 A * | 4/2006 |

OTHER PUBLICATIONS

International Search Report of PCT/JP2008/061888, mailing date of Aug. 19, 2008.

Supplementary European Search Report dated Mar. 3, 2011, issued in corresponding European Patent Application No. 08777739.7.

* cited by examiner

# INDEX DEVICE FOR MACHINE TOOL

TECHNICAL FIELD

The present invention relates to index devices for machine tools, and more particularly, to an index device for a machine tool, such as a spindle head (which corresponds to a machining head in this description) used in a composite machining apparatus such as a five-axis machining apparatus (machining apparatus capable of performing simultaneous five-axis control), or a rotary table device.

BACKGROUND ART

An example of a spindle head for a machine tool includes a fork which rotates around an A-axis while holding a spindle unit, which rotates a tool, at both sides of the spindle unit and a driving unit (hereinafter referred to as a C-axis driving unit) which rotates the fork around a C-axis (Patent Document 1).
Patent Document 1: U.S. Pat. No. 5,584,621

The above-described C-axis driving unit includes a rotary shaft including an inner sleeve secured to the fork, a bearing which supports the rotary shaft (inner sleeve) such that the rotary shaft is rotatable, and a drive motor for rotating the rotary shaft, all of which are accommodated in a housing. The drive motor includes a rotor (motor rotor) secured to the rotary shaft and a stator (motor stator) secured to the housing such that the stator surrounds the rotor. Thus, the C-axis driving unit included in the spindle head according to Patent Document 1 includes a direct drive motor (so-called DD motor) for driving the rotary shaft. In addition, the rotor and the stator included in the drive motor are accommodated, together with a portion of the rotary shaft, in the housing such that three sides thereof, that is, the peripheral, top, and bottom sides thereof are surrounded. The C-axis driving unit serves as an index device which rotates the rotary shaft (fork) to a desired angular position using the drive motor.

Each of the above-described C-axis driving unit included in the spindle head, the above-mentioned rotary table device, etc., is assembled to a machine tool as an index device to form a component of the machine tool, and is generally used while being supported by the machine tool such that a component thereof which corresponds to a housing (frame) is attached to the machine tool at a suitable position. In addition, although not described in Patent Document 1, the above-described index device is generally provided with a clamp mechanism for maintaining an angular position of a rotation object (e.g., the fork in the spindle head) after indexing the angular position.

When a machine tool is used for a predetermined period of time, it becomes necessary to perform maintenance for the bearing, the clamp mechanism, etc., included in the above-described index device. However, it is extremely difficult to perform the maintenance without removing the index device from the machine tool. Therefore, according to the related art, the entire body of the index device is removed from the machine tool to perform the maintenance. For example, in the above-described spindle head, the entire body of the C-axis driving unit is removed from the machine tool.

However, the spindle head according to Patent Document 1 has a problem that the process of removing the entire body of the C-axis driving unit from the machine tool is cumbersome. More specifically, the C-axis driving unit included in the above-described spindle head according to Patent Document 1 includes the DD motor as drive means thereof, and a plurality of cables (e.g., a current supplying line, a ground line, and a line for a detector) are connected to the motor stator included in the DD motor. The cables are arranged such that the cables extend to the outside of the housing, and are connected to the corresponding wiring lines provided in the machine tool with connectors. Therefore, the cables must be disconnected from the wiring lines provided in the machine tool in the process of removing the C-axis driving unit from the machine tool. In addition, after the maintenance, the cables must be reconnected to the wiring lines in the process of reattaching the C-axis driving unit to the machine tool. The process of connecting and disconnecting each wiring line must be repeated the same number of times as the number of wiring lines, and therefore this process is extremely cumbersome and takes a long time. The process of connecting and disconnecting the wiring lines becomes more cumbersome as the number of drive motors increases.

DISCLOSURE OF INVENTION

Problems to be Solved by the Invention

The present invention has been made in view of the above-described situation, and an object of the present invention is to provide a structure of an index device with which processes related to maintenance of the index device can be facilitated.

Means for Solving the Problems

The present invention is applied to an index device for a machine tool including a rotary shaft to which a rotation object is secured at one end of the rotary shaft; a housing which surrounds at least an outer periphery of the rotary shaft to support the rotary shaft; a bearing provided between the housing and the rotary shaft; and drive means provided between the housing and the rotary shaft and including a drive motor including a motor rotor and a motor stator arranged concentrically around the rotary shaft to rotate the rotary shaft, the motor stator being secured to the housing, the motor rotor being secured to the rotary shaft.

The invention is characterized in that the housing includes a casing member at a side opposite the rotation object and a securing member at a rotation-object side, the motor stator being secured to the casing member, the bearing being interposed between the securing member and the rotary shaft, the casing member being detachably connected to the securing member, in that a built-in unit is constituted by assembling the rotary shaft, the bearing, the motor rotor, and the securing member together and an enclosure unit is constituted by assembling the motor stator and the casing member together and placing a cable connected to the motor stator such that the cable extends to the outside from the side opposite the rotation object with respect to the securing member, and in that the built-in unit is connected to the enclosure unit such that the built-in unit is capable of being inserted into and extracted from the enclosure unit from the rotation-object side.

The number of drive motors included in the drive means is not limited. In the case where a plurality of the drive motors are arranged in series along an axial direction of the rotary shaft, the structure in which the built-in unit can be inserted into and extracted from the enclosure unit can be obtained by applying the invention. More specifically, the casing member may be characterized in that at least the motor stator included in the drive motor that is at the side opposite the rotation object is secured to the casing member.

Advantages

According to the present invention, in the index device, such as a spindle head and a rotary table device, used in the machine tool, a housing is divided into the casing member and the securing member along the axial direction of the rotary shaft. In addition, the built-in unit can be inserted into and extracted from the enclosure unit which includes the cable connected to the motor stator, from the rotation-object side. Therefore, the built-in unit can be extracted from the enclosure unit and removed from the machine tool without removing the enclosure unit including the motor stator from the machine tool. As a result, maintenance for the components such as the bearing and the clamping mechanism included in the built-in unit and the enclosure unit can be easily performed without performing the process of disconnecting the cables. Thus, the maintenance process for the index device can be facilitated and the time required for the maintenance process can be reduced.

According to the invention, in the above-described index device, the drive means includes a plurality of the drive motors arranged in series along an axial direction of the rotary shaft, and the motor stator included in the drive motor that is at the side opposite the rotation object is secured to the casing member. Therefore, the built-in unit can be extracted without disconnecting the cable from at least the motor stator included in the drive motor at the side opposite the rotation object. Accordingly, the maintenance process can be facilitated and the time required for the maintenance process can be reduced.

REFERENCE NUMERALS

1: machine tool, 2: bed, 3: column, 4: cross rail, 5: saddle, 6: ram, 6a: head attachment portion, 7: table, 8: machining head, 9: spindle, 10: spindle unit, 11: first support head, 12: base, 13: casing, 14: leg, 20: second support head, 21: enclosure unit, 22: built-in unit, 30: housing, 30a: casing member, 30b: securing member, 30c: retaining sleeve, 30d: inner cylinder, 30e: outer cylinder, 31: first housing member, 31a: main body, 31b: first housing sleeve, 31c: outwardly facing window, 32: second housing member, 32a: main body, 32b: second housing sleeve, 33: connecting member, c1: connector, c11: cable, H1: cable hole, c2: connector, c21: cable, H2: cable hole, 40: rotary shaft, 41: first shaft member, 41a: main body, 41b: first outer sleeve, 41c: first inner sleeve, 41d: cylindrical space, 41e: small-diameter portion, 41f: cylindrical member, 42: second shaft member, 42a: main body, 42b: second outer sleeve, 42c: second inner sleeve, 42d: recessed portion, 42e: flange member, 42f: connecting member, 50: clamping mechanism, 51: clamp sleeve, 51a: thick-walled portion, 51b: thin-walled portion, 52: pressure-receiving member, 53: pressure chamber, 54: fluid path, 54a: outlet, B1: bearing, B2: bearing, B1a: inner ring, B1b: outer ring, B1c: cylindrical roller, M: drive means, M1: drive motor, M1a: motor rotor, M1b: motor stator, M1c: stator sleeve, M2: drive motor, M2a: motor rotor, M2b: motor stator, M2c: stator sleeve

BEST MODES FOR CARRYING OUT THE INVENTION

Figure 9:
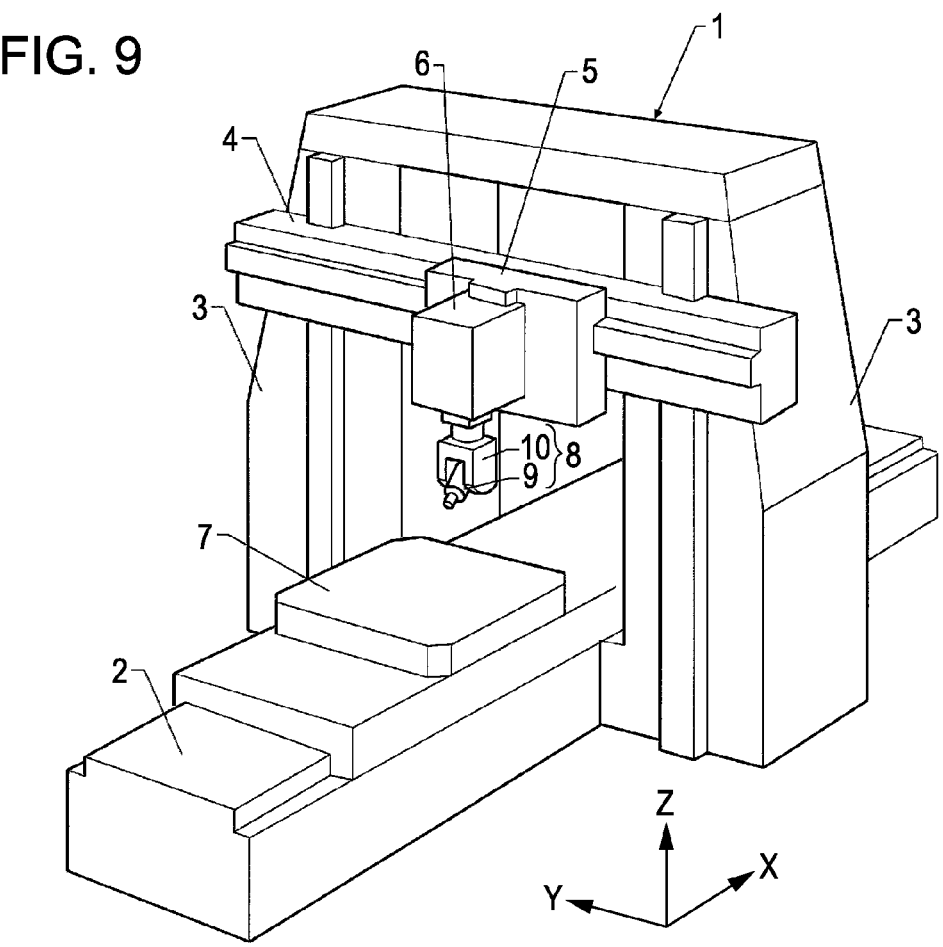
FIG. 9 is a perspective view illustrating the entire body of the machine tool.

Referring to FIG. 9, a gate-type machine tool (machining center) used as a composite machining apparatus, such as a five-axis machining apparatus or a multi-axis machining apparatus, will be described as an example of a machine tool 1 to which the present invention is applied. The machine tool 1 shown in the figure is a machining apparatus capable of performing simultaneous five-axis control, and the main body of the machine tool 1 includes left and right columns 3 and 3 which stand upright from either side of a bed 2; a cross rail 4 which extends between the columns 3 and 3 and moves in the vertical direction (Z-axis direction) along one of front and back surfaces of the columns 3; a saddle 5 which moves horizontally in the left-right direction (Y-axis direction) along the front surface of the cross rail 4 (along a surface at the same side as the surfaces of the columns 3 on which the cross rail 4 is provided); a ram 6 which moves in the Z-axis direction along the front surface of the saddle 5; and a table 7 which moves in the front-back direction along the top surface of the bed 2. In addition, a machining head 8 (which corresponds to the above-described spindle head) is detachably attached to the ram 6 included in the main body of the machine tool. The machining head 8 includes a spindle unit 10 provided with a spindle 9 as a component thereof.

In the machine tool 1, during processing of a workpiece, the table 7, the cross rail 4, the saddle 5, and the ram 6 are moved and the machining head 8 are caused to index the angular position (rotational position) of the spindle unit 10 under numerical control based on a preset program. Thus, the gate-type machine tool can process the workpiece by abutting a tool against each processing surface of the workpiece at a suitable angle, and is thereby capable of cutting the workpiece into a complicated shape.

Figure 7:
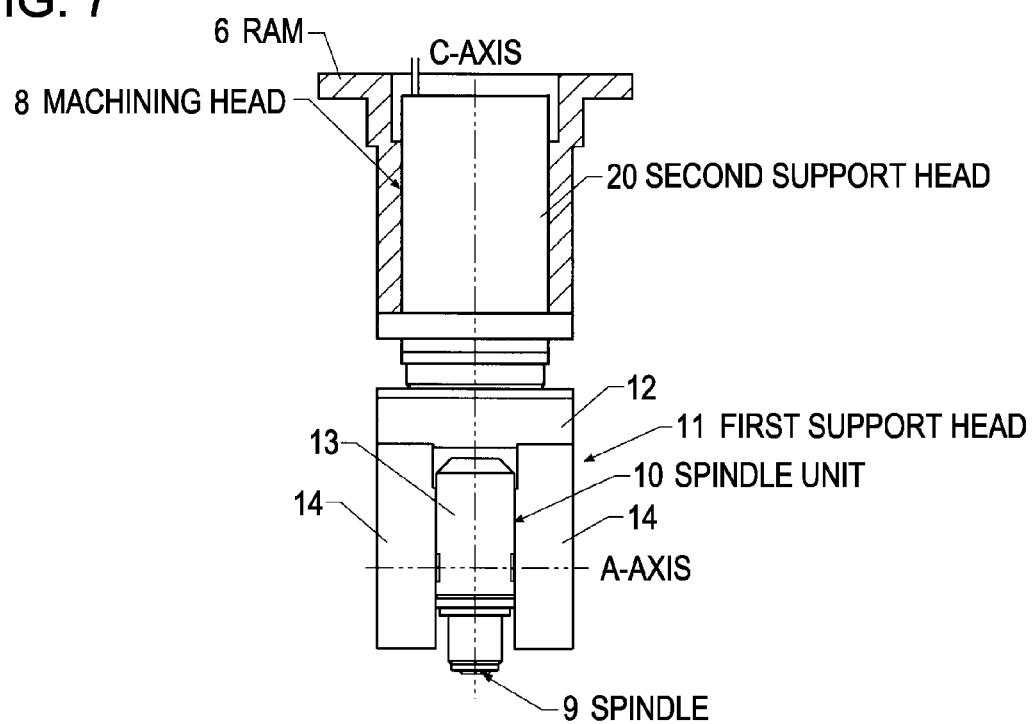
FIG. 7 is a diagram illustrating the state in which the ram and the machining head are assembled together.

As shown in FIG. 7, the machining head 8 includes the spindle unit 10 provided with the spindle 9 to which the tool can be attached; a first support head 11 which supports the spindle unit 10 such that the spindle unit 10 can rotate while the angle thereof is adjusted; and a second support head (which corresponds to the above-described C-axis driving unit) 20 which supports the first support head 11 such that the first support head 11 is rotatable at a side opposite to the side at which the spindle unit 10 is provided. The first support head 11 (a base 12 of the first support head 11) corresponds to a rotation object according to the present invention, and the second support head 20 corresponds to an index device.

The spindle unit 10 is a spindle head including a built-in motor. The spindle 9 is rotatably supported in a casing 13 included in the spindle unit 10, and is rotated at a high speed by the built-in motor (not shown).

The first support head 11 supports the spindle unit 10 such that the spindle unit 10 can rotate about an axial line (hereinafter referred to as an "A-axis") which is perpendicular to an axial direction (hereinafter referred to as a "C-axis direction") which extends in the vertical direction. The first support head 11 rotates the spindle unit 10 about the A-axis using the built-in motor to index the angular position of the spindle unit 10. The C-axis is parallel to the Z-axis of the machine tool 1.

The first support head 11 has the shape of a fork in which a pair of legs 14 and 14 are attached to the base 12 (portion close to the second support head 20) such that the legs 14 and 14 are separated (spaced) from each other, and a spindle unit 10 is supported between the legs 14 and 14. More specifically, a pair of support shafts (not shown) are attached to the spindle unit 10 at either side thereof such that the support shafts are rotatably supported in the respective legs 14 and such that the rotational axes thereof coincide with the A axis, and the spindle unit 10 is rotatably supported between the pair of legs 14 and 14 by the support shafts. The support shafts are rotated by the built-in motor, which is disposed in the legs 14, so that the spindle unit 10 can be rotated about the A axis and the angular position thereof can be indexed.

The second support head 20 supports the first support head 11 such that the first support head 11 can rotate about the C-axis, and rotates the first support head 11 using built-in drive means to index the angular position of the first support head 11. As a result, the angular position of the spindle unit 10 can be indexed. The second support head 20 is attached to the ram 6 of the machine tool 1, and the first support head 11 is attached to the second support head 20 at one end thereof. In the following description, each part of the second support head 20 is basically assumed to have a cylindrical shape or an annular shape having the C axis as an axial line. In addition, the state in which parts are "connected" to each other means the state in which they are fastened and secured to each other by means of screw members, such as screws or bolts.

Figure 1:
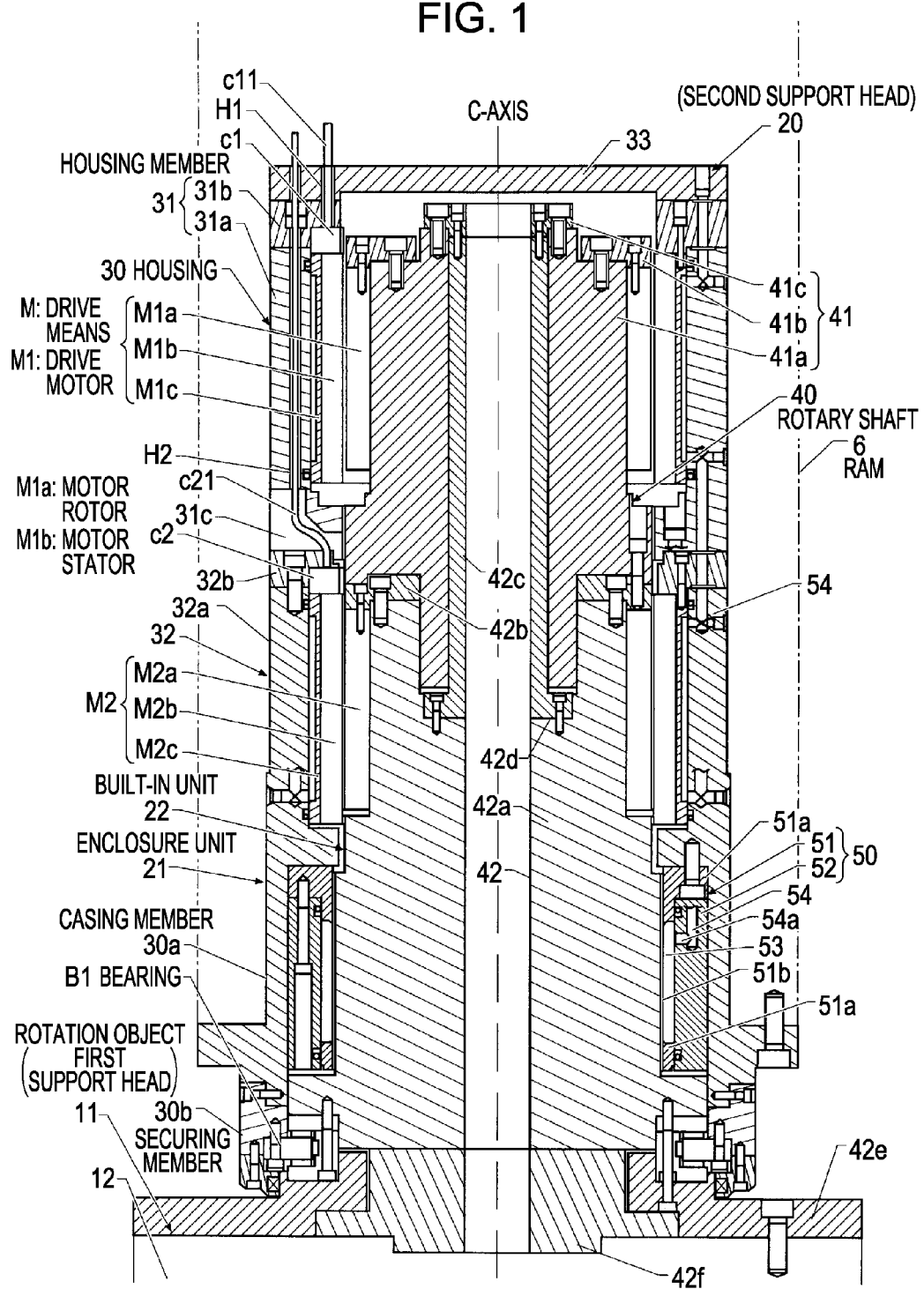
FIG. 1 is a sectional view of an index device for a machine tool.
Figure 2:
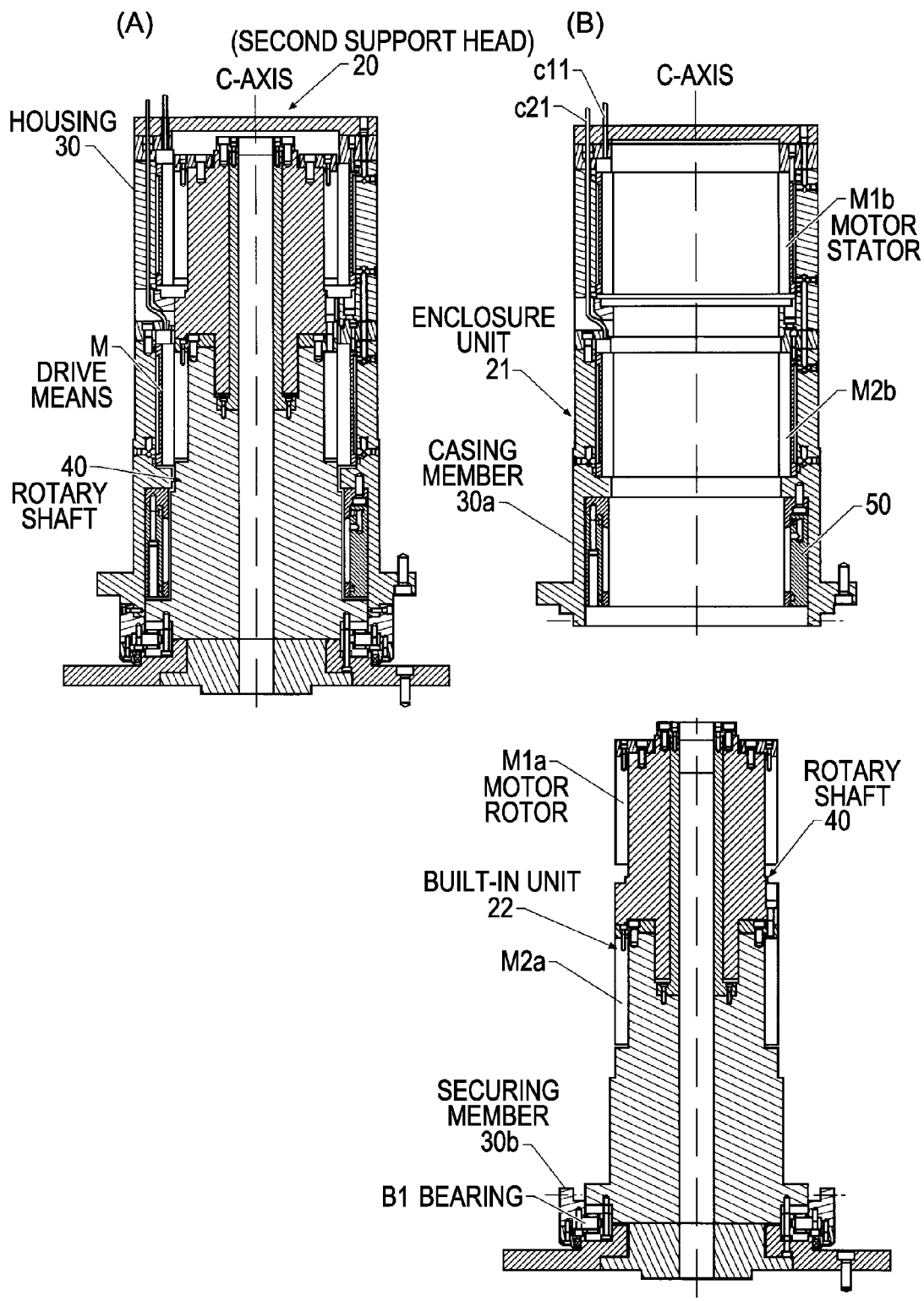
FIG. 2 Parts (A) and (B) of FIG. 2 illustrate an assembled state and a disassembled state, respectively, of the structure shown in FIG. 1.

As shown in FIGS. 1 and 2, the second support head 20 includes an enclosure unit 21 and a built-in unit 22 housed in the enclosure unit 21. The built-in unit 22 is connected to the enclosure unit 21 such that the built-in unit 22 can be inserted into and extracted from the enclosure unit 21 along the C-axis direction from the rotation-object side. The built-in unit 22 is supported such that the built-in unit 22 can rotate about the C-axis with respect to the enclosure unit 21. In the example shown in the figures, to allow the built-in unit 22 to be inserted into and extracted from the enclosure unit 21, the diameter of each part of the inner peripheral surface of the enclosure unit 21 is set to be larger than the diameter (outer diameter) of the built-in unit 22 at any position at the side opposite the rotation object with respect to that part.

The second support head 20 includes a housing 30; a rotary shaft 40 which is rotatably supported in the housing 30; a bearing B1 which is interposed between the housing 30 and the rotary shaft 40; drive means M which is also interposed between the housing 30 and the rotary shaft 40; and a clamping mechanism 50 (for holding the rotary shaft 40 in a non-rotatable manner) which is also interposed between the housing 30 and the rotary shaft 40.

The drive means M rotates the rotary shaft 40 with respect to the housing 30, which is secured to the machine tool 1. In the example shown in the figures, the drive means M includes two drive motors M1 and M2 which are arranged in series with a gap therebetween in the C-axis direction. Each of the drive motors M1 and M2 is operated while being directly connected to a load without using a decelerator, such as a gear (this type of motor is commonly called a direct drive (DD) motor). The drive motors M1 and M2 respectively include motor stators M1$b$ and M2$b$, motor rotors M1$a$ and M2$a$, and stator sleeves M1$c$ and M2$c$, which are concentrically arranged (so-called inner-rotor-type DD motor). The motor stators M1$b$ and M2$b$ are formed by winding coils around fixed iron cores. The motor rotors M1$a$ and M2$a$ include magnets arranged along a circumferential direction such that the magnets face the inner peripheral surfaces of the respective motor stators M1$b$ and M2$b$ at positions close to the inner peripheral surfaces of the respective motor stators M1$b$ and M2$b$. The stator sleeves M1$c$ and M2$c$ hold the motor stators M1$b$ and M2$b$, respectively.

The housing 30 serves to support the rotary shaft 40 and includes a casing member 30$a$ and a securing member 30$b$ which are detachably connected to each other. The casing member 30$a$ is at a side opposite the rotation object, and the motor stators M1$b$ and M2$b$ of the drive motors M1 and M2 are secured to the casing member 30$a$. The securing member 30$b$ is at the rotation-object side, and the bearing B1 is interposed between the securing member 30$b$ and the rotary shaft 40.

In the example shown in the figures, the casing member 30$a$ surrounds at least the outer peripheries of the motor stators M1$b$ and M2$b$, and includes two housing members 31 and 32 and a lid-shaped member (lid member) 33. The housing members 31 and 32 are connected to each other to form an elongate cylindrical shape, and can be separated from each other in the C-axis direction. The lid member 33 is connected to the combined body of the housing members 31 and 32 at the side opposite the rotation object to cover an opening therein. In the following description, of the two housing members 31 and 32, the housing member 31 disposed at the upper side in the figures is called a first housing member, and the housing member 32 disposed at the lower side is called a second housing member. The casing member 30$a$, which is formed by combining the first housing member 31, the second housing member 32, and the lid member 33, has an inner space which opens toward the rotation object. The motor stators M1$b$ and M2$b$ and the clamping mechanism 50 are housed in an outer section of the inner space. In addition, most part of the built-in unit 22 can be housed in an inner section of the inner space.

The first housing member 31 includes a main body 31$a$ which has an L shape in a half cross section such that the main body 31$a$ is bent inward at a bottom end thereof and a first housing sleeve 31$b$ which projects radially inward and which is connected to the main body 31$a$ at a top end thereof. Thus, the first housing member 31 as a whole has an angular U shape which opens inward in a half cross section.

The second housing member 32 includes a main body 32$a$ and a second housing sleeve 32$b$ which projects radially inward and which is connected to the main body 32$a$ at a top end thereof. The second housing sleeve 32$b$ is connected to a lower portion of the first housing member 31, so that the second housing member 32 is secured to the first housing member 31.

The securing member 30$b$ is a retaining sleeve which is detachably connected to the main body 32$a$ of the second housing member 32 at a bottom end (casing member 30$a$) thereof such that the outer periphery of the bearing B1 is surrounded by the securing member 30$b$. The securing member 30$b$ is formed by connecting a plurality of components to each other such that the securing member 30$b$ as a whole has an angular U shape which opens inward in a half cross section and such that the outer periphery (outer ring) of the bearing B1 can be housed in the inner space of the securing member 30$b$. The top end surface of the securing member 30$b$ and the bottom end surface of the casing member 30$a$ are positioned with respect to each other by fitting projecting and recessed portions to each other, and are connected to each other at a plurality of positions in a circumferential direction by screws inserted radially inward from the outer peripheries thereof.

The rotary shaft 40 mainly includes a plurality of shaft members 41 and 42 having through holes centered on the axial center of the rotary shaft 40. The shaft members 41 and 42 can be separated from each other in the C-axis direction at a position corresponding to the position where the first housing member 31 and the second housing member 32 can be separated from each other. In the following description, the shaft member 41 which is disposed in a space surrounded by the inner periphery of the first housing member 31 is called a first shaft member, and the shaft member 42 which is disposed in a space surrounded by the inner periphery of the second housing member 32 is called a second shaft member.

The first shaft member 41 includes a main body 41a having a lower portion which projects radially outward so as to face a lower portion of the first housing member 31; a first outer sleeve 41b which is connected to an upper portion of the main body 41a at an outer position thereof such that the first outer sleeve 41b projects radially outward; and a first inner sleeve 41c having an outer peripheral portion which is connected to the upper portion of the main body 41a at an inner position thereof such that the first inner sleeve 41c projects radially inward. The drive motor M1 is disposed in a cylindrical space between the first shaft member 41 and the first housing member 31. An inner peripheral portion of the first inner sleeve 41c and a lower portion of the main body 41a are connected to the second shaft member 42.

In the upper drive motor M1, the motor stator M1b is secured to the inner periphery of the first housing member 31 with the stator sleeve M1c, and the motor rotor M1a is secured to the outer periphery of the first shaft member 41. More specifically, the motor stator M1b is concentrically fitted to the inner periphery of the stator sleeve M1c, and the stator sleeve M1c is connected to a lower portion of the first housing sleeve 31b so that the motor stator M1b can be secured to the first housing member 31. In addition, the motor rotor M1a is fitted to the outer peripheral surface of the first shaft member 41, and is connected to the bottom surface of the first outer sleeve 41b, so that the motor rotor M1a can be secured to the first shaft member 41.

Cables c11 are connected to the upper drive motor M1 by a connector c1. The cables c11 include, for example, U-phase, V-phase, and W-phase current supply cables for supplying current to coils included in the motor stator M1b, a ground wire, and a detection wire for detecting abnormality of the drive motor M1. A locally recessed space for receiving the connector c1 is formed in the bottom surface of the first housing sleeve 31b, and the connector c1 is disposed in the recessed space. In addition, the first housing sleeve 31b and the lid member 33 are provided with a cable hole H1 which extends in the vertical direction to allow the cables c11 to pass therethrough.

The second shaft member 42 has a stepped shape and includes a small-diameter portion which is fitted to the inner periphery of the first shaft member 41 and a large-diameter portion which abuts on the bottom end surface of the first shaft member 41. The small-diameter portion and the large-diameter portion are connected to each other in the C-axis direction. In other words, the second shaft member 42 mainly includes a main body 42a which extends in the C-axis direction, a second outer sleeve 42b which connected to an upper portion of the main body 42a at an outer position thereof such that the second outer sleeve 42b projects radially outward; and a second inner sleeve 42c which is connected to the upper portion of the main body 42a at an inner (central) position thereof such that the second inner sleeve 42c projects along the inner periphery of the first shaft member 41. A recessed portion 42d is formed in the top end surface of the main body 42a at a central position thereof, and a lower portion of the main body 41a of the first shaft member 41 and a lower portion of the second inner sleeve 42c are disposed in the recessed portion 42d. The second inner sleeve 42c of the second shaft member 42 is connected to an inner peripheral portion of the first inner sleeve 41c disposed on the second inner sleeve 42c, and the second outer sleeve 42b of the second shaft member 42 is connected to the main body 41a of the first shaft member 41 disposed on the second outer sleeve 42b.

The second shaft member 42 is provided with a flange member 42e disposed at the lower side of the main body 42a and a connecting member 42f disposed such that the flange member 42e is clamped between the connecting member 42f and the main body 42a. The flange member 42e and the connecting member 42f are connected to the bottom surface of the second shaft member 42. The bottom end surface of the connecting member 42f and the top end surface of the base 12 of the first support head 11 are positioned with respect to each other by fitting projecting and recessed portions to each other.

The second shaft member 42 and the second housing member 32 have portions which project inward or outward at suitable positions so that two annular spaces are formed between the members 42 and 32 at positions separated from each other in the vertical direction. The drive motor M2 and the clamping mechanism 50 are separately disposed in the two annular spaces. In addition, another space is formed between the second shaft member 42 and the securing member 30b, and the bearing B1 is disposed in that space.

The lower drive motor M2 is disposed in the upper one of the two spaces. Similar to the upper drive motor M1, the lower drive motor M2 includes the motor rotor M2a, the motor stator M2b, and the stator sleeve M2c, each of which is secured to the second housing member 32 by the second housing sleeve 32b or to the second shaft member 42 by the second outer sleeve 42b.

A plurality of cables c21 are connected to the lower drive motor M2 by a connector c2. A locally recessed space for receiving the connector c2 is formed in the bottom surface of the second housing sleeve 32b. In addition, the second housing sleeve 32b, the first housing member 31, the first housing sleeve 31b, and the lid member 33 are provided with a cable hole H2 which extends in the axial direction to allow the cables c21 to pass therethrough. In addition, an outwardly facing window 31c at which the cables c21 are exposed is formed in the outer periphery of the first housing member 31 at the bottom end thereof. The outwardly facing window 31c is used to insert the cables c21 into the cable hole H2 after the first housing member 31 and the second housing sleeve 32b are connected to each other.

The clamping mechanism 50 is disposed in the lower one of the two spaces. The clamping mechanism 50 includes a clamp sleeve 51 which relatively compresses the rotary shaft 40 so that the rotary shaft 40 can be restrained from rotating with respect to the clamp sleeve 51; and a pressure-receiving member 52 which guides working fluid used to deform the clamp sleeve 51. The pressure-receiving member 52 and the clamp sleeve 51 are successively disposed in a concentric manner on the inner periphery of the second housing member 32. The clamp sleeve 51 has a groove in the outer periphery thereof, so that a deformable thin-walled portion 51b is formed between upper and lower thick-walled portions 51a and 51a. The groove and the pressure-receiving member 52 defines a pressure chamber 53 between the outer surface of the thin-walled portion 51b and the pressure-receiving member 52. The clamp sleeve 51 is disposed such that the thin-walled portion 51b is close to the second shaft member 42. In addition, a fluid path 54 which communicates with the pressure chamber 53 is formed in the pressure-receiving member 52, and an outlet 54a of the fluid path 54 opens into the pressure chamber 53. The fluid path 54 extends through the housing members 31 and 32 and the lid member 33, and communicates with an external fluid path (not shown) at a connecting member 33. When the fluid is supplied to the fluid path 54, the thin-walled portion 51b is deformed radially inward, so that the second shaft member 42 is compressed and the rotary shaft 40 is restrained from rotating.

Figure 8:
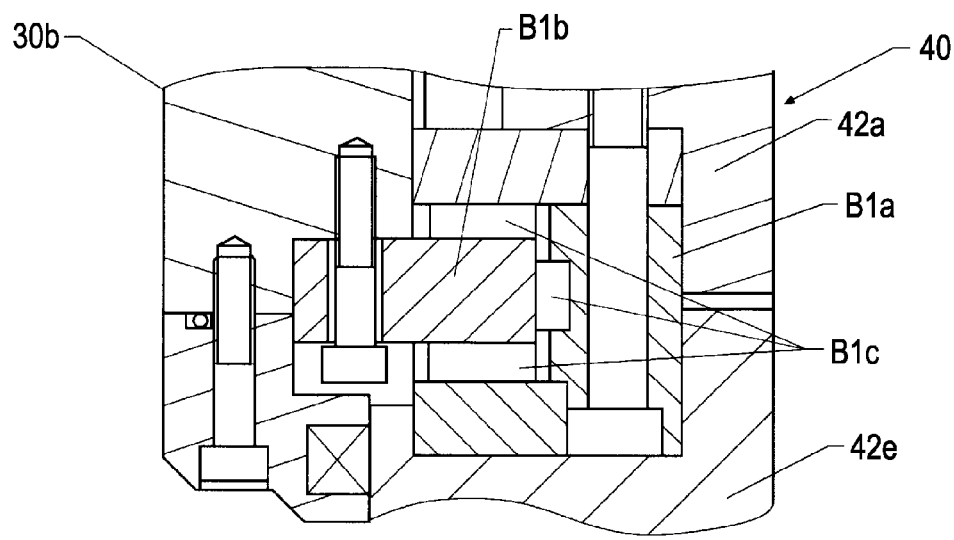
FIG. 8 is a sectional view illustrating the structure of a bearing.

The bearing B1 is a multi-row roller bearing capable of supporting loads in both the axial direction and the radial direction. More specifically, the bearing B1 is a triple-row roller bearing (also called a triple-row cylindrical roller bearing or an axial-radial roller bearing). As shown in FIG. 8, the bearing B1 (triple-row roller bearing) includes an inner ring B1a, an outer ring B1b, and a plurality of cylindrical rollers B1c interposed between the inner ring B1a and the outer ring B1b. The inner ring B1a is formed by assembling a plurality of parts such that the inner ring B1a has an angular U shape which opens outward in a half cross section. An inner peripheral portion of the outer ring B1b is disposed in the opening in the inner ring B1a at an intermediate position thereof in the height direction. The inner ring B1a and the outer ring B1b are connected to the rotary shaft 40 and the securing member 30b, respectively. The cylindrical rollers B1c are disposed at the upper side, the lower side, and the inner side of the outer ring B1b. A load in the axial direction is supported by the cylindrical rollers B1c and B1c at the upper side and the lower side, and a load in the radial direction is supported by the cylindrical roller B1c at the inner side. The cylindrical roller B1c disposed at the inner side is held by a holding member (not shown).

The amount of rotation of the rotary shaft 40, that is, an angular position of the first support head 11, is detected by a rotation detector (not shown) which is secured to both the housing 30 and the rotary shaft 40. A detection signal obtained by the rotation detector is transmitted to a control device of the machine tool 1, and is used for controlling the rotation of the first support head 11.

In the above-described second support head 20, the enclosure unit 21 according to the present invention corresponds to a component obtained by integrally connecting the casing member 30a, which is at the side opposite to the rotation-object side (at the side opposite the rotation object) in the housing 30, the motor stators M1b and M2b of the two drive motors M1 and M2, respectively, which constitute the drive means M, and the clamping mechanism 50 to each other. The cables c11 and c21 connected to the motor stators M1b and M2b, respectively, extend to the outside from the side opposite the rotation object.

The built-in unit 22 corresponds to a component obtained by integrally connecting the remaining members, that is, the securing member 30b, which is positioned at the rotation-object side in the housing 30, the rotary shaft 40, the motor rotors M1a and M2a of the drive motors M1 and M2, respectively, and the bearing B1 to each other.

According to the second support head 20 having the above-described structure, the built-in unit 22 can be inserted into or extracted from the enclosure unit 21 as described above. More specifically, the diameter of each part of the inner space of the enclosure unit 21 which receives the built-in unit 22 (for example, the diameters of the inner peripheral surfaces of the motor stators M1b and M2b in areas where the drive motors M1 and M2 are provided) is set to be larger than the outer diameter of the built-in unit 22 at any position on the side opposite the rotation object with respect to that part. Therefore, the built-in unit 22 can be independently removed from the machine tool 1. As a result, maintenance for the components, such as the bearing B1 and the clamping mechanism 50, included in the second support head 20 can be performed without removing the casing member 30a, to which the motor stators M1b and M2b are secured, from the machine tool 1.

Since it is not necessary to remove the motor stators M1b and M2b from the machine tool 1 in the maintenance process, the above-described process of disconnecting and reconnecting the cables connected to the motor stators M1b and M2b from/to the cables provided in the machine tool can be omitted. As a result, the maintenance process can be facilitated and the time required for the maintenance process can be reduced. Since the components, such as the bearing B1, which are included in the built-in unit 22 are removed from the machine tool 1, the maintenance for those components can be easily performed outside the machine tool. In addition, since the inner space of the enclosure unit 21 is exposed when the built-in unit 22 is removed, maintenance for some components, such as the clamp sleeve 51, which are included in the enclosure unit 21 can also be performed.

Figure 3:
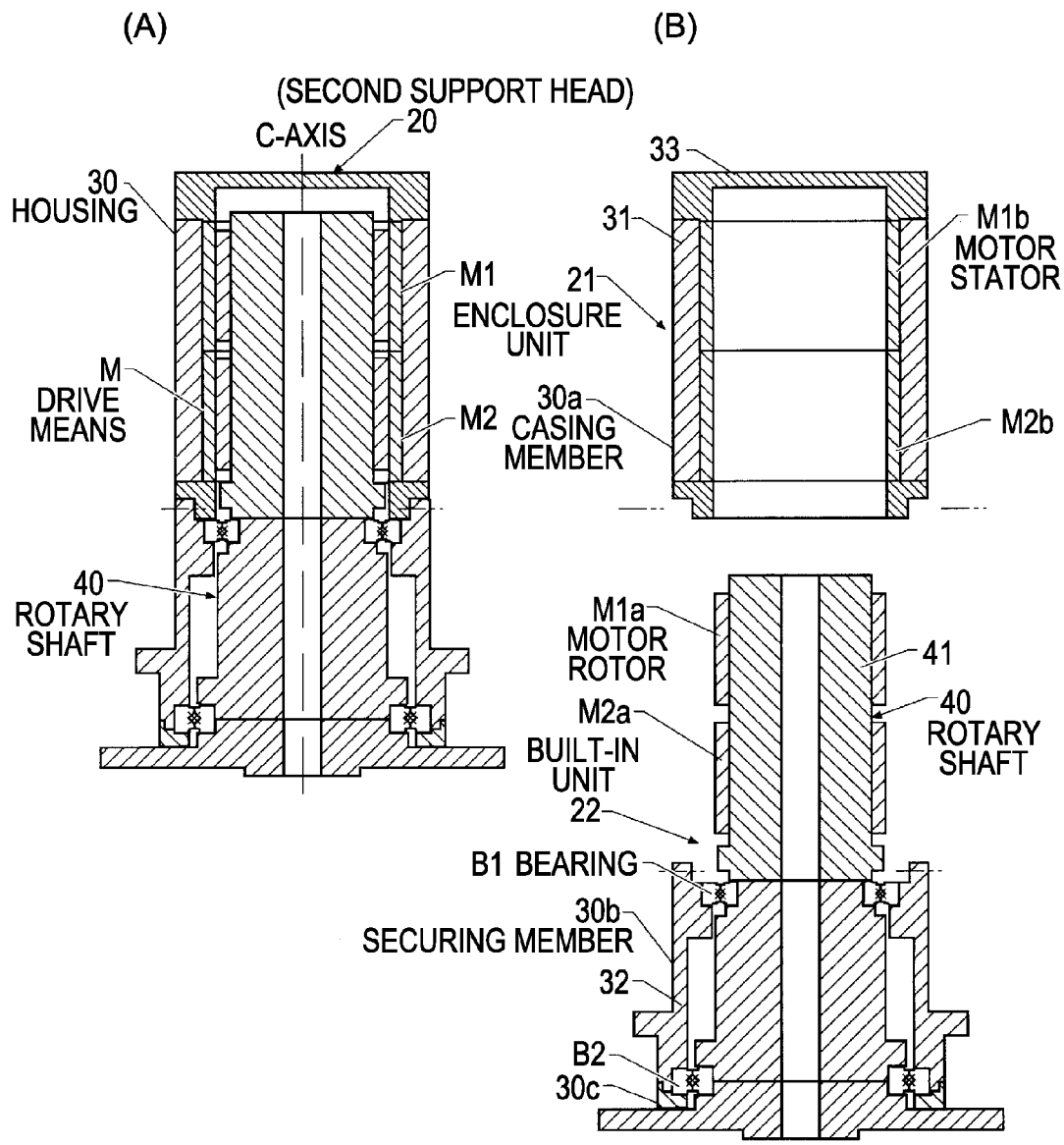
FIG. 3 Parts (A) and (B) of FIG. 3 illustrate an assembled state and a disassembled state, respectively, of a second support head according to a first modification.

Modifications of the second support head 20 will now be described with reference to FIGS. 3 to 5. In the second support head 20 shown in FIG. 3, the casing member 30a is constituted by one of the two housing members 31 and 32 which is at the side opposite the rotation object in the housing 30 (the first housing member 31) and the lid member 33. In addition, the securing member 30b is constituted by one of the housing members which is at the rotation-object side (the second housing member 32) and a retaining sleeve 30c (corresponds to the securing member in the above-described example). The enclosure unit 21 is obtained by securing the motor stators M1b and M2b of all of the drive motors M1 and M2 included in the drive means M to the first housing member 31, and the built-in unit 22 is obtained by securing the motor rotors M1a and M2a of the drive motors M1 and M2 to the rotary shaft 40 and placing a plurality of bearings B1 and B2 between the rotary shaft 40 and the second housing member 32. The drive motors M1 and M2 are arranged in series along the C-axis direction with an extremely small gap therebetween, and cross roller bearings are used as the bearings B1 and B2.

Figure 4:
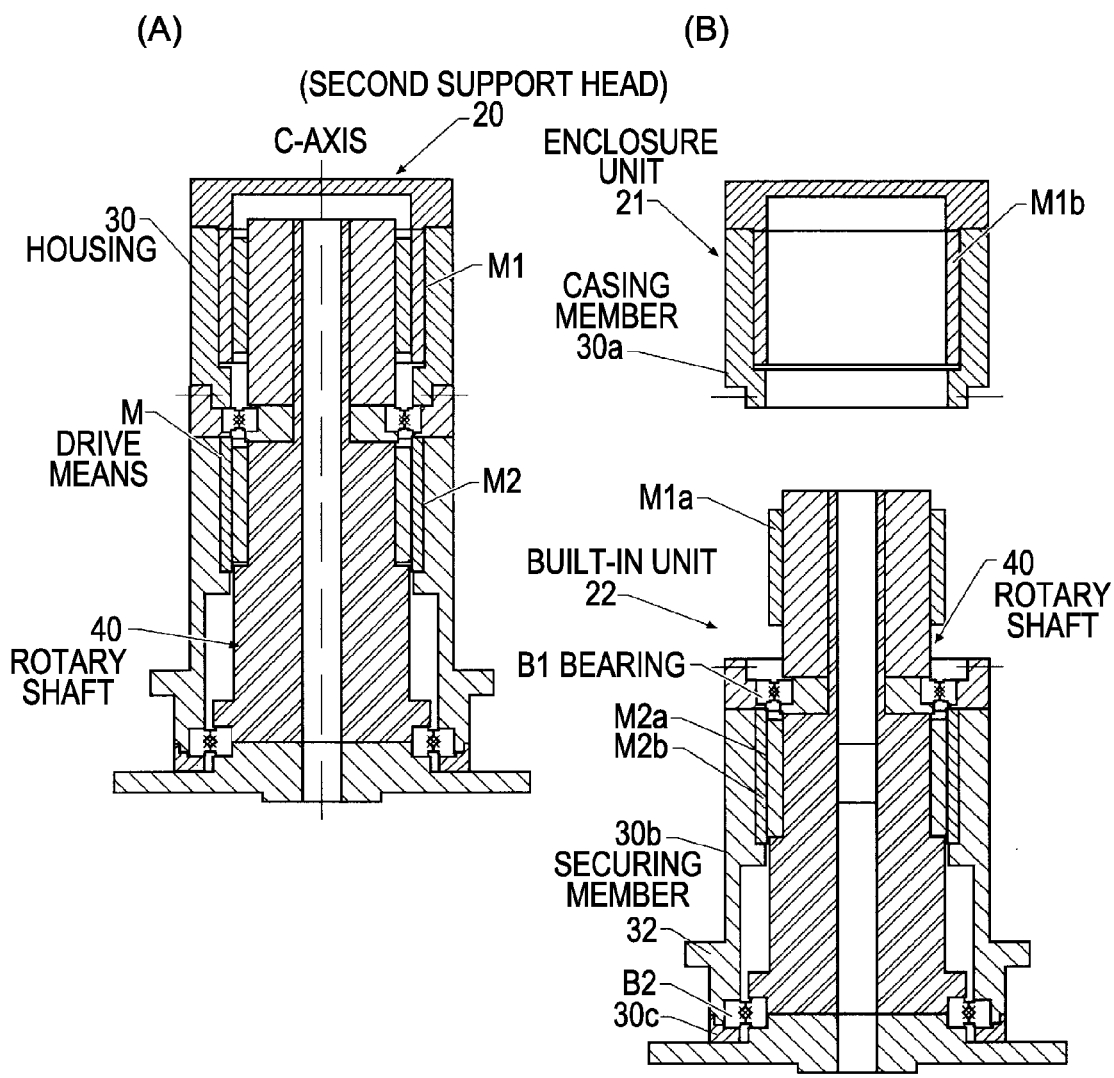
FIG. 4 Parts (A) and (B) of FIG. 4 illustrate an assembled state and a disassembled state, respectively, of a second support head according to a second modification.

In the second support head 20 shown in FIG. 4, similar to the above-described examples, the drive means M includes a plurality of drive motors M1 and M2 arranged in series in the axial direction. However, in this second support head 20, the enclosure unit 21 is obtained by securing only the motor stator M1b included in the drive motor M1, which is at the side opposite the rotation object, to the first housing member 31 included in the casing member 30a. Therefore, in the second support head 20 shown in FIG. 4, different from the above-described examples, the drive motor M2, which is at the rotation-object side, is disposed between the rotary shaft 40 and the second housing member 32, which is included in the securing member 30b. In this case, to detach the built-in unit 22, it is necessary to disconnect the cables (not shown) connected to the motor stator M2b, which is at the rotation-object side. However, compared to the case in which the above-described disconnecting process is performed for each of the drive motors (motor stators) as in the structure of the related art, the process can be facilitated and the time required for the process can be reduced.

Figure 5:
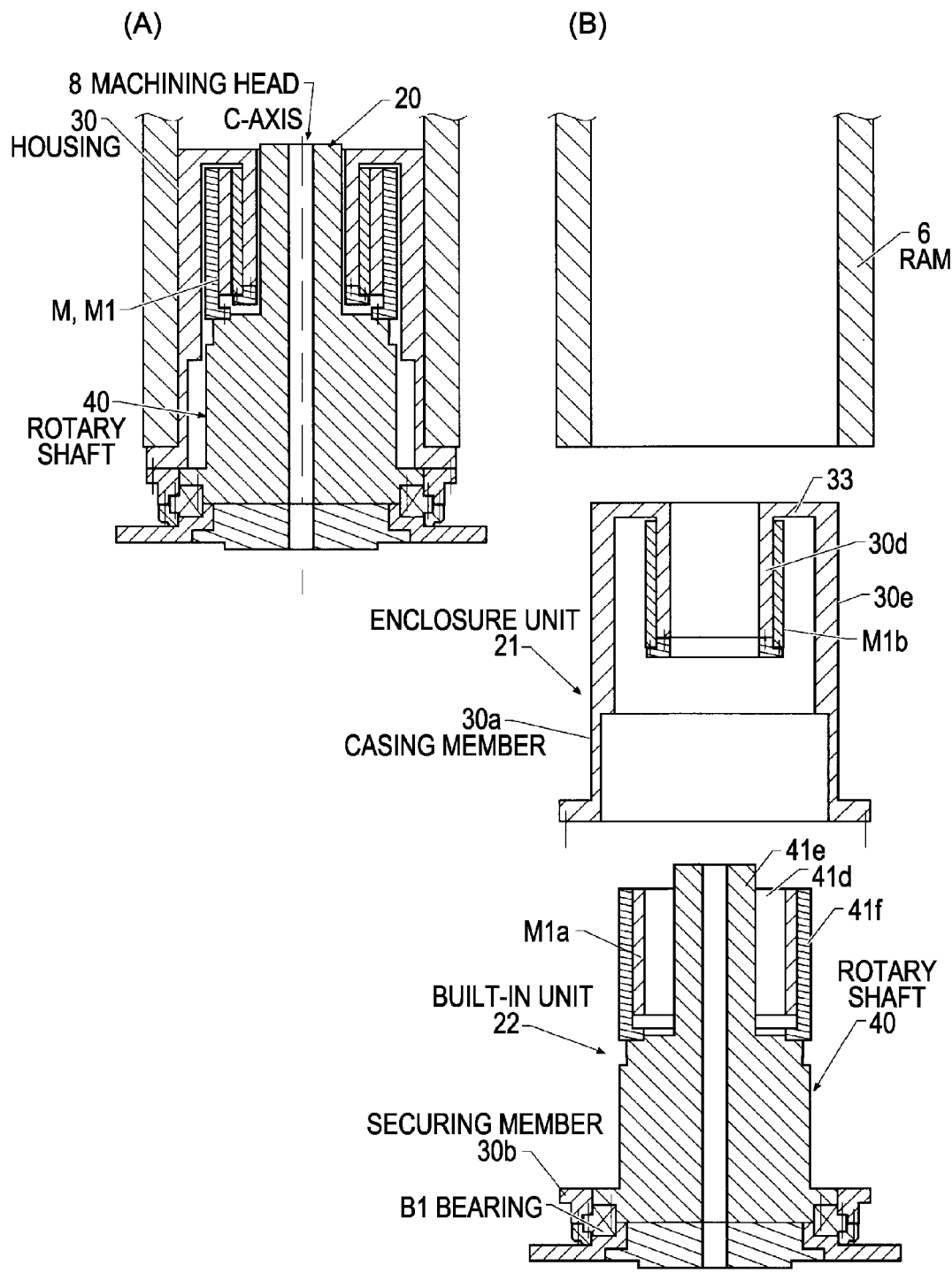
FIG. 5 Parts (A) and (B) of FIG. 5 illustrate an assembled state and a disassembled state, respectively, of a second support head according to a third modification.

In the second support head 20 shown in FIG. 5, the drive motor M1 included in the drive means M is a so-called outer-rotor-type DD motor in which the motor rotor M1a surrounds the outer periphery of the motor stator M1b. In the example shown in the figure, the rotary shaft 40 has a small-diameter portion 41e at an end opposite the rotation object, and a cylindrical member 41f is attached to the rotary shaft 40 such that the cylindrical member 41f surrounds the small-diameter portion 41e. Thus, a cylindrical space 41d is formed at the end of the rotary shaft 40 in a concentric manner. The motor rotor M1a of the drive motor M1 is secured at the outer periphery of the cylindrical space 41d, that is, to the inner peripheral surface of the cylindrical member 41f, to constitute the built-in unit 22 together with the securing member 30b.

The casing member 30a included in the enclosure unit 21 has a double-cylinder structure including an inner cylinder 30d and an outer cylinder 30e. The outer cylinder 30e and the inner cylinder 30d are concentrically arranged, and are connected to each other by a connecting portion 33 at the side opposite the rotation object. The enclosure unit 21 is obtained by securing the motor stator M1b to the outer peripheral surface of the inner cylinder 30d.

As in the second support head 20 shown in FIG. 5, the drive motor included in the drive means M is not limited to the inner-roller-type DD motor, and the outer-roller-type DD motor may also be used.

Also in the second support head 20 shown in FIG. 5, the built-in unit 22 can be inserted into or extracted from the enclosure unit 21. More specifically, with regard to the inner peripheral surfaces which extend in the C-axis direction in the casing member 30a, which is the main component of the enclosure unit 21, that is, with regard to the inner peripheral surfaces of the inner cylinder 30d and the outer cylinder 30e, the diameter of each part of each inner peripheral surface is set to be larger than the outer diameter of a portion of the built-in unit 22 which is inserted into an inner space formed by that inner peripheral surface at any position of the built-in unit 21 at the side opposite the rotation object with respect to that part. For example, the diameter of each part of the inner peripheral surface of the inner cylinder 30d is set to be larger than the diameter of the small-diameter portion 41e of the rotary shaft 40, which is inserted into the inner space formed by the inner peripheral surface, at any position of the small-diameter portion 41e at the side opposite the rotation object with respect to that part. Similarly, the diameter of each part of the inner peripheral surface of the outer cylinder 30e is set to be larger than the diameter of the rotary shaft 40 (large-diameter portion) and the cylindrical member 41f, which are inserted into the inner space formed by the inner peripheral surface, at any position of the rotating shaft 40 or the cylindrical member 41f at the side opposite the rotation object with respect to that part.

According to the present invention, it can be said from the above discussion that the enclosure unit 21 has no surface which faces the built-in unit 22 in the C-axis direction in the inside of the enclosure unit 21. In addition, in the example shown in FIG. 5, the casing member 30a and the securing member 30b are connected to each other by flange connection by inserting screw members in a direction parallel to the C-axis direction. Thus, in the present invention, the method for connecting the casing member 30a and the securing member 30b is not particularly limited.

Figure 6:
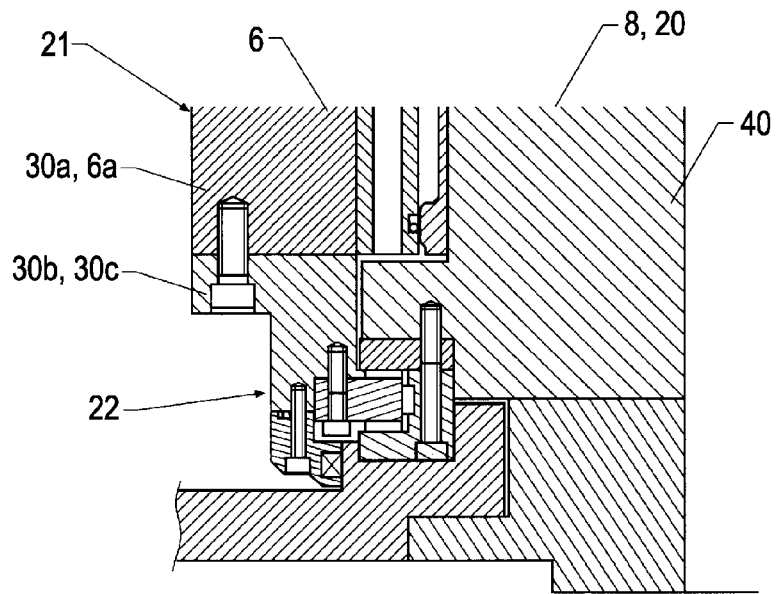
FIG. 6 is a half sectional view illustrating a connecting structure between a ram and a machining head according to a first modification.

The present invention is not limited to the above-described embodiments. For example, as shown in FIG. 6, with regard to the connecting structure between the ram 6 and the machining head 8 (second support head 20), a head attachment portion 6a of the ram 6 may also be used as the casing member 30a. More specifically, the head attachment portion 6a having a circular space therein in a horizontal cross section may be used as the casing member 30a, and the enclosure unit 21 may be obtained by securing the motor stators of the drive motors, the clamping mechanism, etc., on the inner peripheral surface of the head attachment portion 6a. In such a case, the housing members 31 and 32 and the lid member 33 included in the above-described second support head 20 can be omitted. In addition, the above-described retaining sleeve 30c may be used as the securing member 30b which is connected to the head attachment portion 6a.

In addition, the number of drive motors included in the drive means is not limited, and three or more drive motors may also be included. In the example shown in FIG. 5, the flanges provided for connecting the machining head 8 to the ram 6 are used to connect the casing member 30a and the securing member 30b to each other. However, dedicated flanges for connecting the casing member 30a and the securing member 30b to each other may also be provided in addition to the flanges for connecting the machining head 8 to the ram 6.

In addition, the index device for the machine tool according to the present invention is not limited to the machining head (spindle head), and the present invention may also be applied to a rotary table device for indexing an angular position by rotating a rotary table on which a workpiece is placed. In this case, the rotary table serves as the rotation object according to the present invention.

The invention claimed is:

1. An index device for a machine tool, the index device comprising:
   a rotary shaft (40) to which a rotation object is secured at one end of the rotary shaft (40);
   a housing (30) which surrounds at least an outer periphery of the rotary shaft (40) to support the rotary shaft (40);
   a bearing (B1, B2) provided between the housing (30) and the rotary shaft (40);
   drive means (M) provided between the housing (30) and the rotary shaft (40) and including a first drive motor (M1, M2) including a motor rotor (M1a, M2a) and a motor stator (M1b, M2b) arranged concentrically around the rotary shaft (40) to rotate the rotary shaft (40) and the rotation object about a first axis, the motor stator (M1b, M2b) being secured to the housing (30), the motor rotor (M1a, M2a) being secured to the rotary shaft (40), and
   an actuatable clamp mechanism (50) that fixes the rotary shaft (40) in a non-rotatable manner;
   wherein the housing (30) includes a casing member (30a, 31a) and a securing member (30b), the motor stator (M1b, M2b) being secured to the casing member (30a, 31a), the bearing (B1, B2) being interposed between the securing member (30b) and the rotary shaft (40), the casing member (30a, 31a) being detachably connected to the securing member (30b),
   wherein a built-in unit sub-assembly (22) is constituted by assembling the rotary shaft (40), the bearing (B1, B2), the motor rotor (M1a, M2a), and the securing member (30b) together, and
   wherein an enclosure unit (21) is constituted by assembling the motor stator (M1b, M2b) and the casing member (30a, 31a) together and placing a cable (c11, c21) connected to the motor stator (M1b, M2b) such that the cable (c11, c21) extends from the motor stator to outside the housing from a side of the housing that is opposite a side of the housing where the rotation object is located, and
   wherein the built-in unit sub-assembly (22) is connected to the enclosure unit (21) such that the built-in unit sub-assembly (22) is capable of being inserted into and extracted from the enclosure unit (21) from a side of the index device where the rotation-object is located; and wherein the rotation object is a machining head having a support head and a tool spindle that is pivotably mounted to the support head so as to be pivotable about a second axis that is transverse with respect to the first axis.

2. The index device for the machine tool according to claim 1, wherein the drive means (M) includes a further drive motor (M1, M2) having a motor rotor and a motor stator, which further drive motor is arranged in series with the first drive motor along the axial direction of the rotary shaft such that one of the drive motors is distal to the rotation object and one of the drive motors is proximal to the rotation object, and wherein at least the motor stator (M1b, M2b) included in the drive motor (M1, M2) that is distal to the rotation object is secured to the casing member (30a, 31a).

* * * * *